United States Patent
Nonogaki

(10) Patent No.: US 10,142,643 B2
(45) Date of Patent: Nov. 27, 2018

(54) MARKER GENERATING METHOD, MARKER DECODING METHOD, AND MARKER READING DEVICE

(71) Applicant: Kabushiki Kaisha Toshiba, Minato-ku, Tokyo (JP)

(72) Inventor: Nobuhiro Nonogaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 449 days.

(21) Appl. No.: 15/062,894

(22) Filed: Mar. 7, 2016

(65) Prior Publication Data

US 2017/0076166 A1     Mar. 16, 2017

(30) Foreign Application Priority Data

Sep. 11, 2015    (JP) ................. 2015-180177

(51) Int. Cl.
    *G06K 9/68*       (2006.01)
    *H04N 19/44*      (2014.01)
    *G06K 7/14*       (2006.01)
    *G06K 19/06*      (2006.01)

(52) U.S. Cl.
    CPC .......... *H04N 19/44* (2014.11); *G06K 7/1417* (2013.01); *G06K 7/1439* (2013.01); *G06K 19/06046* (2013.01)

(58) Field of Classification Search
    CPC .... H04N 19/44; G06K 7/1417; G06K 7/1439; G06K 19/06046
    USPC ................................. 382/232–252
    See application file for complete search history.

(56) References Cited

U.S. PATENT DOCUMENTS 8,774,453 B2     7/2014    Soderberg et al.
2010/0320273 A1*   12/2010   Iizaka ................ G06K 7/10544
                                                          235/462.32

FOREIGN PATENT DOCUMENTS

| JP | 2003-248805 A | 9/2003 |
| JP | 2008-257611 A | 10/2008 |
| JP | 2011-513809 A | 4/2011 |

* cited by examiner

*Primary Examiner* — Andrew Moyer
(74) *Attorney, Agent, or Firm* — White & Case LLP

(57) ABSTRACT

According to one embodiment, a marker generating method is provided. In the marker generating method, a value in a bit string is replaced with a signal pattern to generate a first signal pattern arrangement. The first signal pattern arrangement is divided into a first partial signal and a second partial signal. The first partial signal having a pattern cycle extended to a pattern cycle of the second partial signal is added to the second partial signal to generate a second signal pattern arrangement. A gradation of shading which indicates a signal of the second signal pattern arrangement is set.

19 Claims, 7 Drawing Sheets

MARKER GENERATING METHOD, MARKER DECODING METHOD, AND MARKER READING DEVICE

CROSS-REFERENCE TO RELATED APPLICATIONS

This application is based upon and claims the benefit of priority from Japanese Patent Application No. 2015-180177, filed on Sep. 11, 2015; the entire contents of which are incorporated herein by reference.

FIELD

Embodiments described herein relate generally to a marker generating method, a marker decoding method, and a marker reading device.

BACKGROUND

Conventionally, there has been known a marker reading device that acquires encoded data from an image of a marker captured by a camera. This marker reading device identifies a pattern of a marker from the image of the marker, and decodes data based on the pattern of the marker.

DETAILED DESCRIPTION

In general, according to one embodiment, a marker generating method is provided. In the marker generating method, a value in a bit string is replaced with a signal pattern to generate a first signal pattern arrangement. The first signal pattern arrangement is divided into a first partial signal and a second partial signal. The first partial signal having a pattern cycle extended to a pattern cycle of the second partial signal is added to the second partial signal to generate a second signal pattern arrangement. A gradation of shading which indicates a signal of the second signal pattern arrangement is set.

Exemplary embodiments of a marker generating method, a marker decoding method, and a marker reading device will be explained below in detail with reference to the accompanying drawings. The present invention is not limited to these embodiments.

Figure 1:
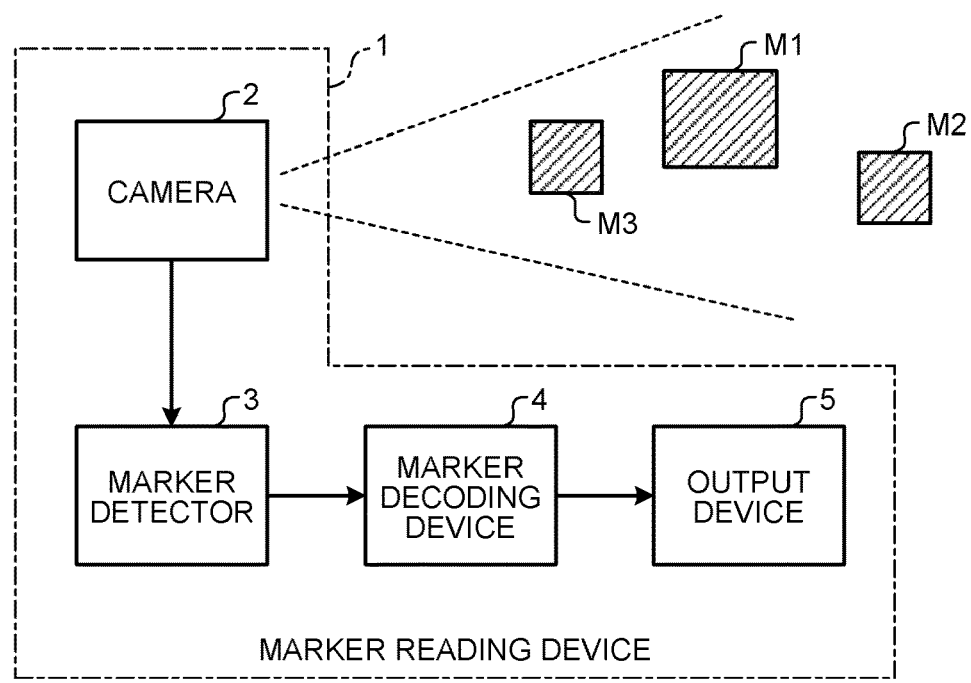
FIG. 1 is a block diagram illustrating a marker reading device according to an embodiment.

FIG. 1 is a block diagram illustrating a marker reading device according to an embodiment. A marker reading device 1 includes a camera 2, a marker detector 3, a marker decoding device 4, and an output device 5. For example, the marker reading device 1 is included in a portable terminal.

The camera 2 captures an image. For example, the camera 2 is a camera attached to a portable terminal. It suffices that the camera 2 detects visible light, and the camera 2 can be a camera capturing color images or that capturing monochromatic images. When a user wishes to acquire information from a marker, the user points the lens of the camera 2 toward the marker. The camera 2 with the lens pointed toward the marker captures an image including a marker image (hereinafter, simply "marker"). The user can capture the marker as the used changes the position of the camera 2 with respect to the marker.

The marker detector 3 detects a marker from a captured image. The marker decoding device 4 decodes data from the marker. The marker detector 3 and the marker decoding device 4 are realized by a calculating device and a storage device having a marker detection program and a marker decoding program installed therein.

The output device 5 outputs data decoded by the marker decoding device 4. For example, the output device 5 is a display that performs displaying based on decoded data.

The marker detector 3 detects the outer shape of a marker that is notified in advance from an image. For example, when the outer shape of a marker is a rectangle having a predetermined aspect ratio, the marker detector 3 recognizes an object having a shape similar to the rectangle as the marker. The marker detector 3 detects a marker by using the shape of the marker itself as a finder pattern for identifying the marker.

It is also possible that the marker detector 3 detects a marker by using a shape other than the outer shape of the marker as a finder pattern. For example, when a marker with a shape having a predetermined shape is provided, the marker detector 3 may detect the marker while using the shape as a finder pattern. When an identification code constituted by a predetermined printing pattern is provided inside or outside a marker, the marker detector 3 may detect the marker by using the identification code as a finder pattern.

FIG. 1 illustrates an example in which the camera 2 is capturing an image including three markers M1, M2, and M3. The marker detector 3 detects the three markers M1, M2, and M3 separately. The marker decoding device 4 decodes data from the three markers M1, M2, and M3 separately.

It is assumed that a marker is inscribed on an object by printing, drawing, or the like. A marker can be displayed on an image screen of a display. A marker can be presented by any means as long as the marker can be read by human's eyes or a camera optically with visible light or near infrared light. The outer shape of the marker is not limited to a rectangle and can be any geometric shape.

Figure 2:
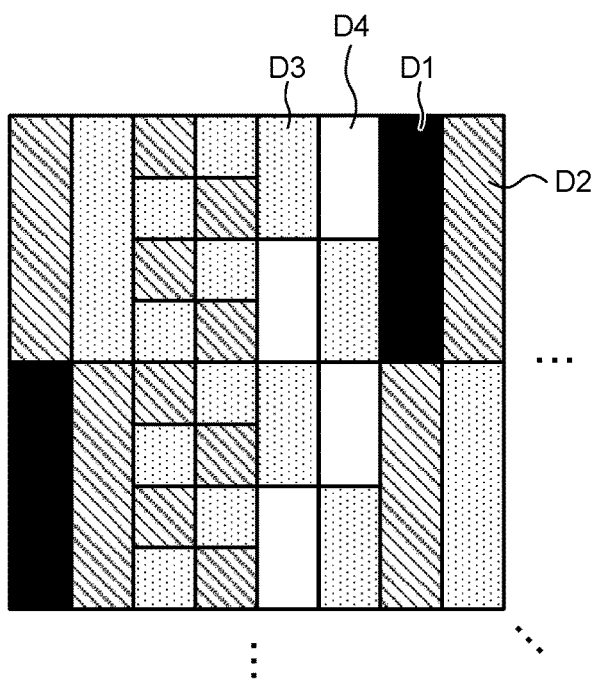
FIG. 2 is a diagram illustrating an example of a marker generated by a marker generating method according to the embodiment.

FIG. 2 is a diagram illustrating an example of a marker. FIG. 2 illustrates a part of a marker having a rectangular outer shape. The marker includes a plurality of cells that are two-dimensionally arranged. The marker is an assembly of the cells. Each of the cells indicates any one of densities set to a plurality of levels. The marker is displayed as a pattern of shading the densities of which are varied stepwise in cell units. In FIG. 2, in a cell having a matrix of 8 by 8, boundaries among cells indicating respective densities set to four different levels are indicated by solid lines.

For example, in a marker inscribed on an object, the shading is expressed by a single color with varied lightness. The marker expresses the difference in the lightness by distinct shading to vary a reflection amount of light. Alternatively, the difference in the lightness of the marker may be expressed by a single color with varied density of dots. In a marker displayed on an image screen, the shading is expressed by displaying a marker in a single color with varied luminance.

The marker is not limited to a marker expressing the shading by a single color with the difference in the lightness. Alternatively, the marker may express the shading by the difference in the lightness as well as a difference in hue. In the following descriptions, it is assumed that a marker expresses the shading by using a difference in lightness ranging from white to black. In the present embodiment, black is also regarded as one of colors.

In FIG. 2, a blackened part (a density D1) indicates a part having the lowest lightness level of four lightness levels. A part indicated with oblique lines (a density D2) indicates a part having the second lowest lightness level after the blackened part. A whitened part (a density D4) indicates a part having the highest lightness level of the four lightness levels. A part indicated with dots (a density D3) indicates a part having the second highest lightness level after the whitened part.

In a sufficiently bright environment, the densities D1 and D4 are recognized as black and white, respectively, by human's eyes. The densities D2 and D3 are recognized as gray with different intensities. The gray of the density D3 is darker than that of the density D2.

Next, a method of generating a marker based on data is described. A marker generating program for realizing the marker generating method in the present embodiment is installed in a computer that is hardware. The computer includes a calculating device, a storage device, and input/output interfaces.

The calculating device is a CPU (central processing unit). The storage device is configured by a ROM (read only memory), a RAM (random access memory), an external storage device, and the like. The calculating device executes various programs. Hardware having the marker generating program installed therein functions as a marker generating device (not illustrated). Functions of the marker generating program are performed with use of the calculating device and the storage device.

Figure 3:
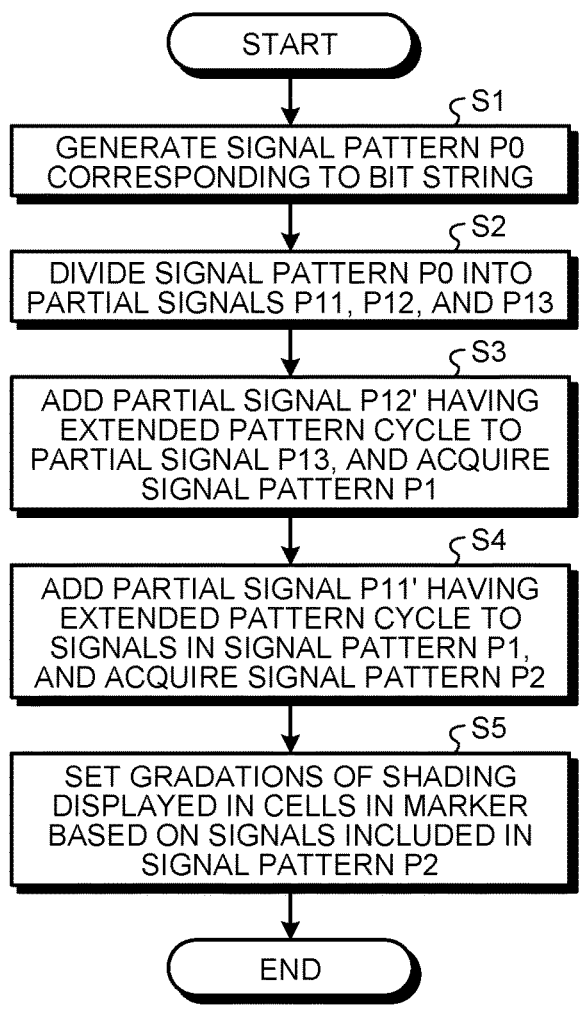
FIG. 3 is a flowchart for explaining procedures of the marker generating method.

Next, the marker generating method is described. FIG. 3 is a flowchart for explaining procedures of the marker generating method according to the present embodiment. As an example, a marker generating method for a bit string of 7 bits "0, 1, 0, 1, 0, 0, 1", which is original data, is described. The bit string is an arbitrary information code. In the present embodiment, the marker generating device applies a technique of so-called Haar-Wavelet transform, in which original data is divided into a plurality of pieces of data and then multiplexed, in order to encode data.

The marker generating device replaces values "0" and "1" in a bit string with respective preset signal patterns. The signal pattern is a combination of two signals respectively having a mutually different level. The two signals can be distinguished from each other because the levels of the two signals differ from each other. The value "0" is replaced with a signal pattern in which a signal of a level L0 is followed by a signal of a level L1. The value "1" is replaced with a signal pattern in which a signal of the level L1 is followed by a signal of the level L0. The level L1 is higher than the level L0 (L0<L1). In this manner, the signal pattern is an arrangement of two signals respectively having a mutually different level and includes shift between the two levels.

Figure 4:
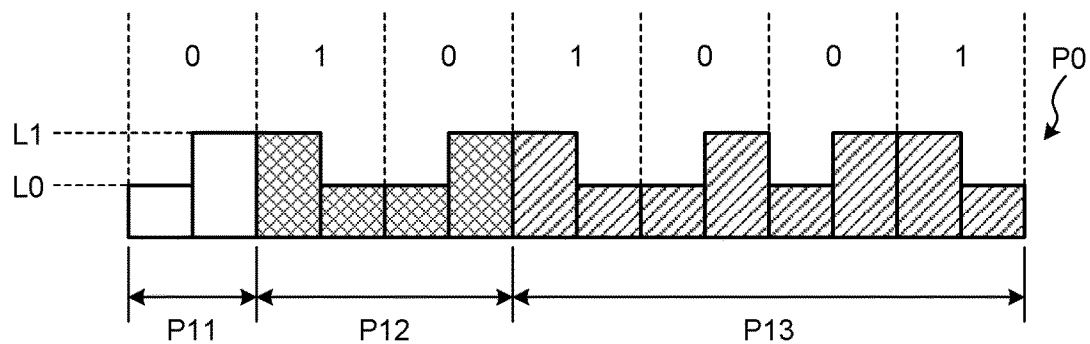
FIG. 4 is an explanatory diagram of data before being encoded to be a marker.

The marker generating device generates a signal pattern P0 (a first signal pattern arrangement) corresponding to a bit string by replacing each value in the bit string with a signal pattern (S1). FIG. 4 is an explanatory diagram of data before being encoded to be a marker. In FIG. 4, signals of the signal pattern P0 are indicated by a bar graph in which the ordinate represents a signal level. Next, the marker generating device divides the signal pattern P0 into three partial signals P11, P12, and P13 (S2).

The partial signal P11 represents data of the highest-order bit of 7 bits. The partial signal P12 represents data of the second and third highest-order bits of the 7 bits. The partial signal P13 represents data of the low-order 4 bits of the 7 bits.

The partial signals P11, P12, and P13 include one ($=2^0$), two ($=2^1$), and four ($=2^2$) signal patterns, respectively. That is, the partial signals P11, P12, and P13 respectively include different numbers of patterns in increments of a power of two. Next, the marker generating device adds the partial signals P11 and P12 each having an extended pattern cycle to the partial signal P13 to generate a second signal pattern arrangement.

Figure 5:
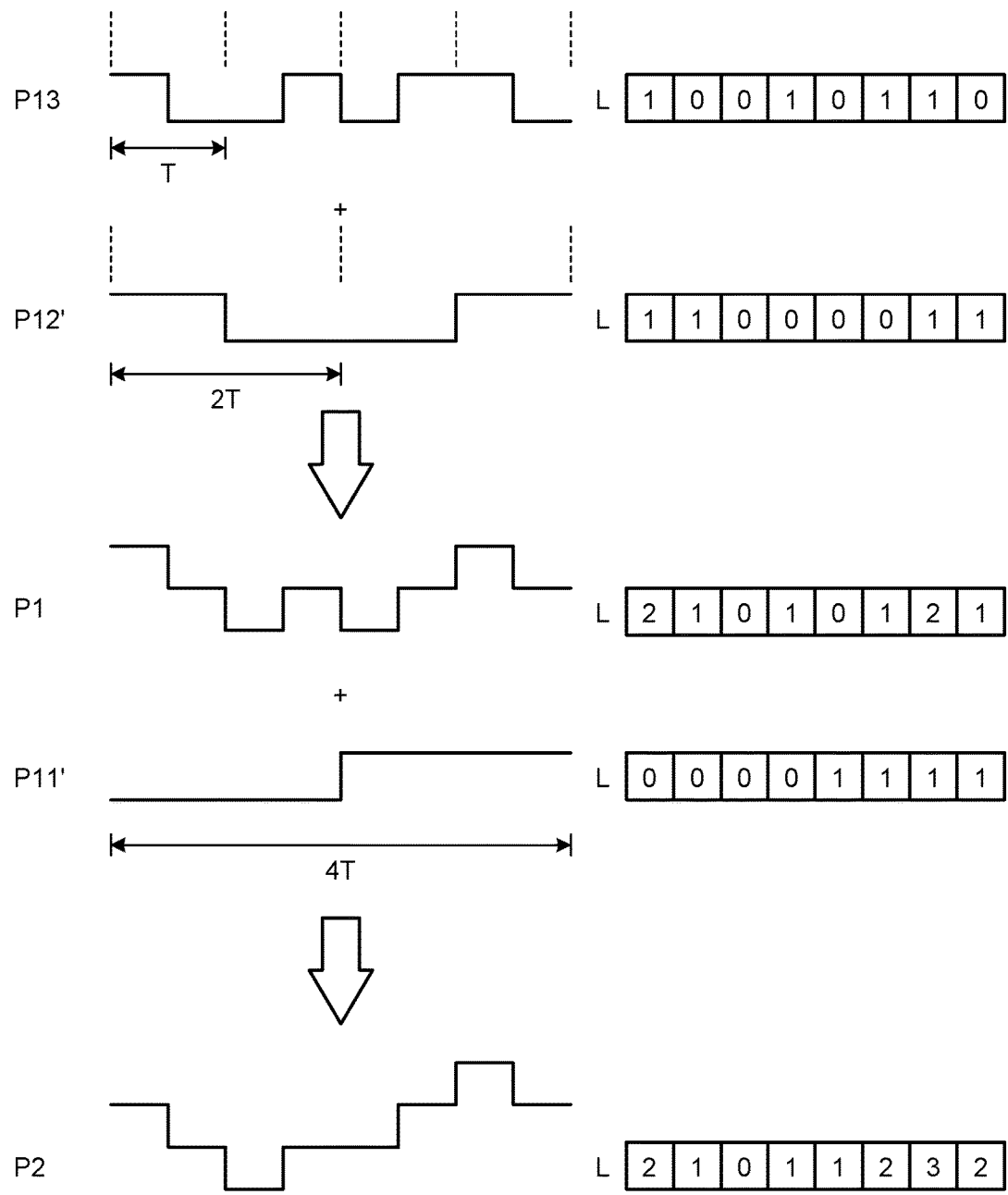
FIG. 5 is an explanatory diagram of procedures of generating a second signal pattern arrangement from a first signal pattern arrangement.

FIG. 5 is an explanatory diagram of procedures of generating a second signal pattern arrangement from a first signal pattern arrangement. In FIG. 5, each of the signal pattern arrangements is indicated as a digital waveform in which the level L0 is a standard level. The partial signal P13 (second partial signal) is a signal pattern arrangement of the levels L1, L0, L0, L1, L0, L1, L1, L0.

The signal pattern P0 has a pattern cycle T same as that of the partial signal P13. The marker generating device extends the pattern cycle of the partial signal P12 (first partial signal) to two times longer than the pattern cycle T of the partial signal P13. The marker generating device generates a partial signal P12' having a pattern cycle 2T that is two times longer than the pattern cycle T. That is, the partial signal P12' has a same arrangement length as the partial signal P13. The partial signal P12' is a signal pattern arrangement of the levels L1, L1, L0, L0, L0, L0, L1, L1.

The marker generating device adds the partial signal P12' to the partial signal P13 to acquire a signal pattern P1 (S3). The signal pattern P1 is a signal pattern arrangement of the levels L2, L1, L0, L1, L0, L1, L2, L1. The level L2 is an addition result of the level L1 and the level L1.

The marker generating device extends the pattern cycle of the partial signal P11 (first partial signal) to four times longer than the pattern cycle T and generates a partial signal P11' having a pattern cycle 4T. That is, the partial signal P11' has a same arrangement length as the signal pattern P1. The partial signal P11' is a signal pattern arrangement of the levels L0, L0, L0, L0, L1, L1, L1, L1.

The marker generating device adds the partial signal P11' to signals in the signal pattern P1 to acquire a signal pattern P2 (a second signal pattern arrangement) (S4). The signal pattern P2 is a signal pattern arrangement of the levels L2, L1, L0, L1, L1, L2, L3, L2. The level L3 is an addition result of the level L2 and the level L1. The signal pattern P2 is constituted by eight signals including the four different levels L0 to L3.

The marker generating device determines a pattern of shading in the marker based on the signal pattern P2. The marker generating device sets the gradations of the shading to be displayed in eight cells of the marker based on the signal pattern P2 (S5).

Figure 6:
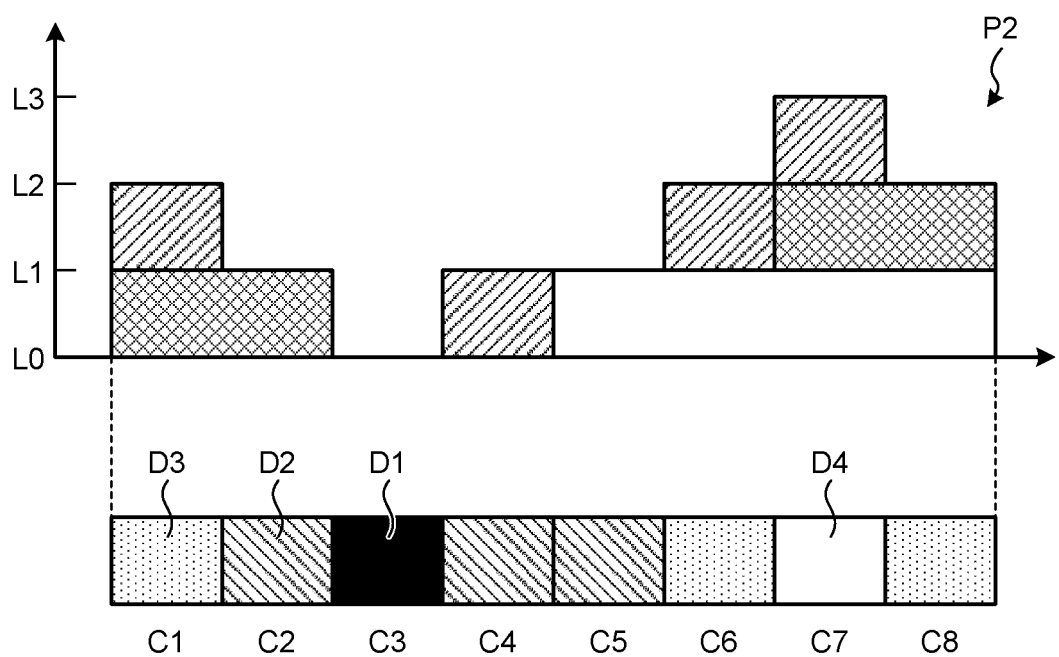
FIG. 6 is an explanatory diagram of a second signal pattern arrangement and a pattern of shading.

FIG. 6 is an explanatory diagram of a second signal pattern arrangement and a pattern of shading. In FIG. 6, signals of the signal pattern P2 are indicated by a bar graph in which the level L0 is a standard level. The signal pattern P2 is constituted by the partial signals P11', P12', and P13 that have been mutually multiplexed.

In the bar graph, parts indicated with oblique lines represent level parts derived from the partial signal P13. Shaded parts represent level parts derived from the partial signal P12'. A whitened part represents a level part derived from the partial signal P11'.

The marker generating device determines the gradations of shading according to the levels of respective signals of the signal pattern P2 for eight cells C1 to C8. The marker generating device sets gradations of lightness or hue in printing the marker as the gradations of shading.

The marker generating device sets the density D1 for a cell corresponding to a signal of the level L0. The marker generating device sets the density D2 for a cell corresponding to a signal of the level L1. The marker generating device sets the density D3 for a cell corresponding to a signal of the level L2. The marker generating device sets the density D4 for a cell corresponding to a signal of the level L3. Accordingly, the bit string "0, 1, 0, 1, 0, 0, 1" is indicated as the densities [D3, D2, D1, D2, D2, D3, D4, D3] in the cells C1 to C8, respectively.

In the present embodiment, the marker generating device determines a pattern of shading for eight cells by encoding of 7-bits data. That is, the marker generating device generates a marker constituted by eight cells that is obtained by converting 7-bits data to a pattern of shading including information of 7 bits.

The marker generating device generates a marker including a plurality of unit areas, each of which includes a plurality of cells corresponding to a signal pattern arrangement. The marker illustrated in FIG. 2 is constituted by eight unit areas. In this case, when a second signal pattern arrangement is equally divided into two partial signals, the ratio between the total of levels in one partial signal and that in the other partial signal is 1:2.

It is assumed here that the levels L0 to L3 are expressed by digital values 0, 1, 2, and 3, respectively. In the signal pattern P2 illustrated in FIG. 6, the total of levels of partial signals in the cells C1 to C4 is four. The total of the levels of the partial signals in the cells C5 to C8 is eight. In this manner, the ratio between the totals of levels of partial signals in equally divided cells is 1:2. According to the marker generating method of the present embodiment, a pattern of shading in a unit area is set based on a signal pattern arrangement having a ratio of 1:2 between the levels of partial signals in equally divided cells.

According to the marker generating method of the present embodiment, the marker generating device divides a first signal pattern arrangement corresponding to original bit string into first partial signal and second partial signal. The marker generating device adds the first partial signal having extended pattern cycles to the second partial signal to generate a second signal pattern arrangement. The marker generating device sets gradations of shading to be displayed in cells of a marker based on the second signal pattern arrangement. Consequently, a marker from which a marker decoding device decodes original data in a stepwise manner depending on resolution of a captured marker can be acquired.

Next, a method of decoding data from a marker generated by the method of the present embodiment is described. A marker decoding program for realizing the marker decoding method described in the present embodiment is installed in a portable terminal that is hardware. Functions of the marker decoding program are performed with use of the calculating device and the storage device in the portable terminal.

Figure 7:
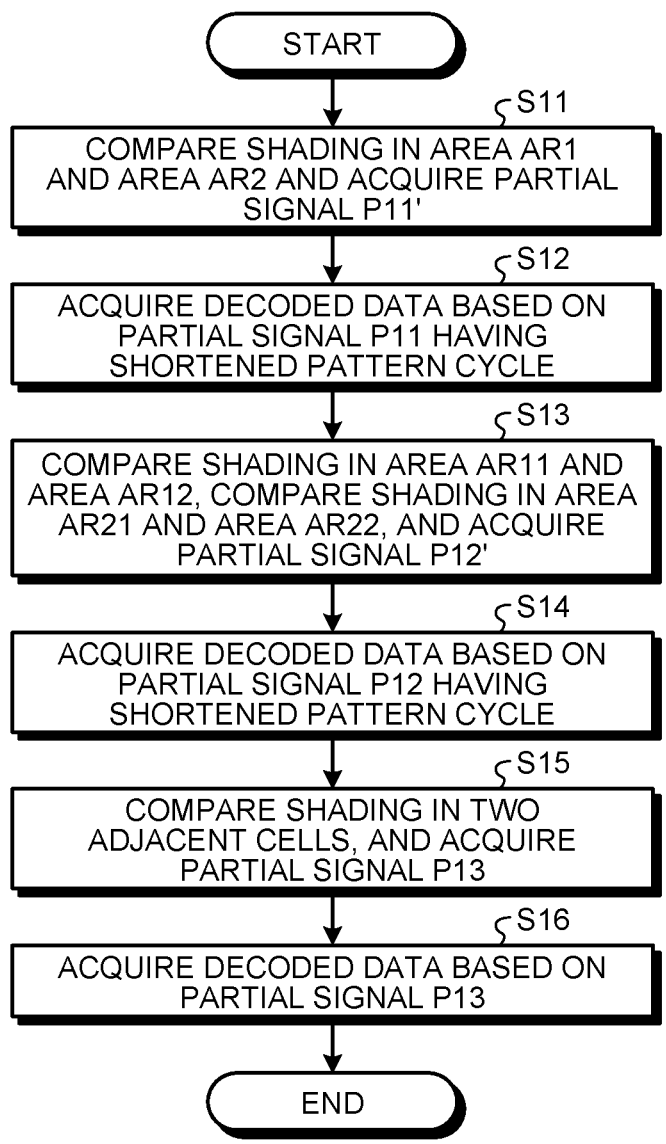
FIG. 7 is a flowchart of procedures of a marker decoding method according to the embodiment.

FIG. 7 is a flowchart of procedures of the marker decoding method according to the present embodiment. The marker decoding device 4 sets an area corresponding to a predetermined number of cells in a marker as a unit area. The marker decoding device 4 decodes data for each unit area.

Figure 8:
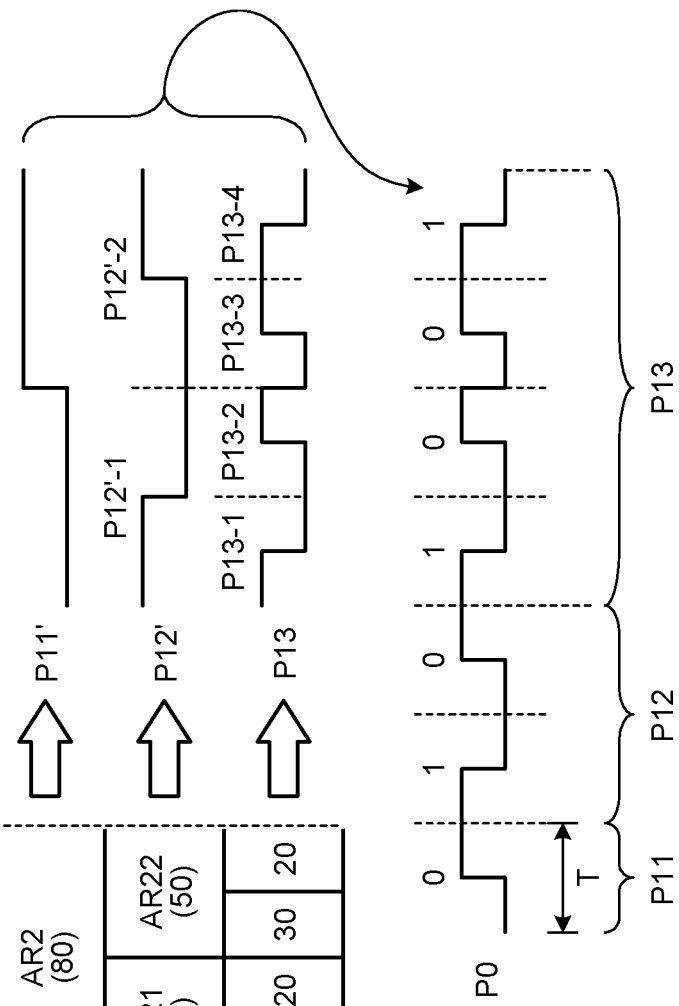
FIG. 8 is an explanatory diagram of decoding of a marker to original data.

FIG. 8 is an explanatory diagram of decoding of a marker to original data. FIG. 8 illustrates a case where an original bit string is decoded from a pattern of shading in a unit area constituted by eight cells C1 to C8. The pattern of shading has been obtained by the above marker generating method. A marker is captured at a resolution allowing the shading in each cell to be identified.

It is assumed that the luminance level detected in the cells C1 to C8 are expressed as values of 20, 10, 0, 10, 10, 20, 30, and 20, respectively. The luminance levels of 0, 10, 20, and 30 correspond to the densities D1, D2, D3, and D4, respectively.

The marker decoding device 4 compares the shading in an area AR1 and an area AR2 (two first partial areas) in a unit area (S11). Each of the area AR1 and the area AR2 constitutes a first partial area. The area AR1 corresponds to four cells C1 to C4. The area AR2 corresponds to four cells C5 to C8. Each of the area AR1 and the area AR2 is a half width of the unit area. The marker decoding device 4 compares the shading in a first cycle. In this case, the first cycle has a pitch of four cells.

The total luminance levels of the cells C1 to C4 in the area AR1 is 40. The total luminance levels of the cells C5 to C8 in the area AR2 is 80. The total luminance level in the area AR1 is smaller than that in the area AR2. Even when an averaged luminance level of any cells is detected at a resolution lower than a resolution allowing the shading in each cell to be identified, the magnitude relation between the luminance levels in the area AR1 and the area AR2 may be detected. In this case, it suffices that at least the magnitude relation between the luminance levels in the area AR1 and the area AR2 is known. In this example, the marker decoding device 4 detects that the luminance level in the area AR1 is smaller than that in the area AR2.

The marker decoding device 4 replaces the magnitude relation between the luminance levels in the area AR1 and the area AR2 with a signal pattern arrangement including mutually different levels. In this example, based on that the luminance level in the area AR1 is lower than that in the area AR2, a signal pattern arrangement in which a signal of the level L0 is followed by a signal of the level L1 is generated. With this process, the marker decoding device 4 acquires the partial signal P11' (first decoding pattern) (S12).

The marker decoding device 4 shortens the pattern cycle of the partial signal P11' by one fourth. The partial signal P11' becomes the partial signal P11 having the pattern cycle T same as that of the original signal pattern P0. The partial signal P11 in which a signal of the level L0 is followed by a signal of the level L1 is obtained.

The marker decoding device 4 performs replacement to the partial signal P11 opposite to the replacement of bit values with a signal pattern in generating a marker (S1). The marker decoding device 4 acquires a value "0" (first data)

from the signal pattern of the partial signal P11. The value "0" is decoded data of the highest-order bit in the original bit string.

Next, the marker decoding device 4 compares the shading in a second cycle having a pitch of two cells. The second cycle is half of the first cycle. The marker decoding device 4 compares the shading in an area AR11 and an area AR12 of the area AR1 (S13). Each of the area AR11 and the area AR12 constitutes a second partial area.

The area AR11 corresponds to the cells C1 and C2. The area AR12 corresponds to the cells C3 and C4. Each of the areas AR11 and AR12 is a half width of the area AR1.

The total luminance level of 30 in the AR11 is larger than the total luminance level of 10 in the area AR12. The marker decoding device 4 obtains a partial signal P12'-1 in which a signal of the level L1 is followed by a signal of the level L0.

The marker decoding device 4 compares the shading in an area AR21 and an area AR22 of the area AR2 (S13). Each of the area AR21 and the area AR22 constitutes a second partial area. The marker decoding device 4 obtains a partial signal P12'-2 in which a signal of the level L0 is followed by a signal of the level L1.

The marker decoding device 4 acquires the partial signal P12' (first decoding pattern) by connecting the partial signal P12'-1 and the partial signal P12'-2 (S14).

The marker decoding device 4 shortens the pattern cycle of the partial signal P12' by one half. The partial signal P12' becomes the partial signal P12 having the pattern cycle T same as that of the original signal pattern P0. The partial signal P12 in which signals of the levels L1, L0, L0, and L1 are arranged in this order is obtained.

The marker decoding device 4 acquires two values "1" and "0" (first data) from the signal pattern arrangement of the partial signal P12. The values "1" and "0" are decoded data of the second and third highest-order bits in the original bit string.

Next, the marker decoding device 4 compares the shading in a third cycle having a pitch of one cell. The third cycle is one-fourth of the first cycle. The marker decoding device 4 compares the shading in two adjacent cells (S15). The comparison of the shading is made by acquiring a marker at a resolution allowing the shading in each cell to be identified.

The marker decoding device 4 compares the shading in the cell C1 and the cell C2. The luminance level of 20 in the cell C1 is larger than the luminance level of 10 in the cell C2. The marker decoding device 4 obtains a partial signal P13-1 in which a signal of the level L1 is followed by a signal of the level L0.

The marker decoding device 4 compares the shading in two adjacent cells of the cells C3 to C8, similarly. The marker decoding device 4 obtains partial signals P13-2, P13-3, and P13-4 according to the comparison result.

The marker decoding device 4 acquires the partial signal P13 (second decoding pattern) by connecting the four partial signals P13-1 to P13-4 (S16). The marker decoding device 4 acquires four values "1, 0, 0, 1" (second data) from the signal pattern arrangement of the partial signal P13. The four values "1, 0, 0, 1" are decoded data of the low-order 4 bits in the original bit string. In this manner, the marker decoding device 4 restores parts of the original data one by one in a stepwise manner.

Next, a method of reading data from a marker with the marker reading device 1 is described. Reading a marker includes capturing by the camera 2, detection by the marker detector 3, and decoding by the marker decoding device 4.

The camera 2 captures an image including a marker. The marker detector 3 detects the marker by detecting a finder pattern from the captured image. The marker detector 3 performs matching of the finder pattern included in the image with a finder pattern that is notified in advance to obtain the positional relation among corresponding points in the both finder patterns. The marker detector 3 obtains a homography matrix based on the obtained positional relation. The marker detector 3 corrects the distortion of the marker based on the homography matrix. The marker detector 3 may omit correcting the distortion.

The marker decoding device 4 recognizes the positions of unit areas in the image. The marker decoding device 4 is notified in advance the number of unit areas arranged in the horizontal direction and the vertical direction in the marker. The marker decoding device 4 divides the marker into the number of unit areas in the horizontal direction and the vertical direction to set the positions of the unit areas.

In this example, it is assumed that an image is captured at a resolution equal to or higher than a first resolution allowing the shading in the first cycle to be detected. In this case, the marker decoding device 4 decodes a first hierarchy of original data by performing S11 and S12 described above.

The marker decoding device 4 is notified in advance that the original data is decoded by performing the decoding processing a predetermined number of times. Alternatively, the marker decoding device 4 may acquire the number of times of the decoding processing from the decoding result of the original data. For example, the marker decoding device 4 may acquire the number of times of the decoding processing in the second or later hierarchy from the decoding result of the first hierarchy of the original data.

It is assumed that, after capturing for decoding of the first hierarchy, a user brings the camera 2 close to the marker or the camera 2 zooms up the marker to capture an image at a higher resolution. When the image is captured at a resolution that is equal to or higher than a second resolution allowing the shading in the second cycle to be detected, the marker decoding device 4 decodes the second hierarchy of the original data by performing S13 and S14 described above. The second resolution is higher than the first resolution.

It is assumed that, after capturing for decoding of the second hierarchy, a user brings the camera 2 close to the marker or the camera 2 zooms up the marker to capture an image at a still higher resolution. When the image is captured at a resolution that is equal to or higher than a third resolution allowing the shading in the third cycle to be detected, the marker decoding device 4 decodes the third hierarchy of the original data by performing S15 and S16 described above. The third resolution is higher than the second resolution.

The marker decoding device 4 acquires the partial signal P12' (S14) based on the second resolution that is higher than the first resolution used for acquiring the partial signal P11' (S12). The marker decoding device 4 further acquires the partial signal P13 (S16) based on the third resolution that is higher than the second resolution used for acquiring the partial signal P12' (S14). The marker decoding device 4 decodes data in a stepwise manner according to the resolution of an image.

The first hierarchy is data relating the summery of information that has been encoded to be a marker. The second hierarchy is data detailed more than the first hierarchy relating information that has been encoded to be a marker. The third hierarchy is data detailed still more than the second hierarchy relating information that has been encoded to be a marker. The marker reading device 1 reads more detailed data from a marker as the marker is taken at a higher resolution. The marker reading device 1 sequentially reads the first to third hierarchies of the original data during a process where the camera 2 focuses on the marker from the out-of-focus state.

The first hierarchy may be a particular data arrangement common to markers. When the marker decoding device 4 acquires such a data arrangement, the marker decoding device 4 may decode the data of the second or later hierarchies. The first hierarchy may include data which shows data size of a marker. When a marker is obtained at a resolution allowing the shading in each cell to be identified by the first capturing, the marker reading device 1 can read the first hierarchy, the second hierarchy, and the third hierarchy of the original data collectively.

In the example illustrated in FIG. 1, the marker M1 is larger than the marker M2 and the marker M3. The marker M2 has a substantially same size as the marker M3. The marker reading device 1 reads encoded detailed information from the marker M1 and reads encoded summery information from the markers M2 and M3.

For example, when a user having acquired the summery information of the marker M2 wishes to acquire detailed information of the marker M2, the user brings the camera 2 close to the marker M2 or causes the camera 2 to zoom up the marker M2 in order to capture the marker M2 at a resolution allowing shading required for decoding to be detected. The marker reading device 1 reads the detailed information from the marker M2 by taking the marker M2 at a higher resolution.

The output device 5 outputs acquired information each time data is read. The output device 5 may display an image including a marker and display the information acquired by decoding by overlapping the information on the marker. A user can easily select a marker more detailed information of which is desired, based on the information displayed together with the marker. The marker reading device 1 can smoothly lead the user to information desired by the user.

It is assumed that the marker reading device 1 reads no information from a marker unless the shading in each cell is sufficiently identifiable. In this case, in response to the change of resolution, the marker reading device 1 reads pieces of information of the marker collectively or reads no information. The marker reading device 1 according to the present embodiment can read information of a marker in a stepwise manner by taking the marker while increasing the resolution according to the procedures in FIG. 7.

A marker in the present embodiment indicates the signal pattern P2 by a pattern of shading. The signal pattern P2 includes data of three hierarchies that are mutually multiplexed. The three hierarchies are the first hierarchy, the second hierarchy, and the third hierarchy of original data. In the signal pattern P2, the respective pattern cycles of the partial signal P11' for the first hierarchy and the partial signal P12' for the second hierarchy are extended with respect to the pattern cycle of the partial signal P13 for the third hierarchy. The marker decoding device 4 can extract signal patterns of the partial signals P11' and P12' from an image of a resolution lower than a resolution allowing the shading in each cell to be identified.

If a marker information of which is read at different resolutions for each area in the marker is used, the area of the marker increases because a plurality of areas are arranged. In a marker in the present embodiment, the first to third hierarchies can be decoded by comparison of the shading in the first to third cycles in a common unit area, respectively. As compared with a marker information of which is read at a different resolution for each area, the marker in the present embodiment can include more information by effectively utilizing small areas.

In the present embodiment, a marker is not limited to a marker having a pattern of shading of four density levels. It suffices that a marker has shading of three or more different gradations. The marker generating device may generate a second signal pattern arrangement including signals of three or more different levels by dividing a first signal pattern arrangement corresponding to a bit string into two or more partial signals.

The marker generating device may divide a first signal pattern arrangement into four or more partial signals mutually having a different number of patterns in increments of a power of two. A second signal pattern arrangement may include data having four or more hierarchies that are mutually multiplexed. The marker generating device may set shading of five or more different gradations for cells. The marker decoding device 4 may decode original data by performing decoding processing four or more times.

The marker decoding device 4 decodes data based on not an absolute value of a luminance value detected for each cell but the magnitude relation between shading in adjacent partial areas. Even when a color temperature or an illuminance value of an environment light applied to the marker changes, the magnitude relation between the shading is maintained as long as the same environment light is applied to both of the partial areas. Therefore, the marker decoding device 4 can decode data accurately irrespective of conditions of an environment light at a position where the marker is read.

The output device 5 is not limited to a display and can be any device that is capable of outputting decoded data. The output device 5 can be a device that outputs data by other methods than displaying. For example, the output device 5 can be a device that outputs decoded data as printed data or a device that outputs decoded data as voice data.

In the above descriptions, there has been explained an example in which a user captures an image including a marker with the camera 2. However, an object provided with a marker can be captured while the camera 2 is fixed. As the object approaches the camera 2, the data of the marker is decoded in a stepwise manner, and then the information is acquired. The object can be recognized from the acquired information. That is, the marker reading device 1 according to the present embodiment can be used also as a recognizing device. Further, in the above descriptions, there has been explained an example in which the marker reading device 1 performs reading from an image including a marker captured by the camera 2. However, the marker reading device 1 can perform reading from an image including a marker obtained by another method.

Figure 9:
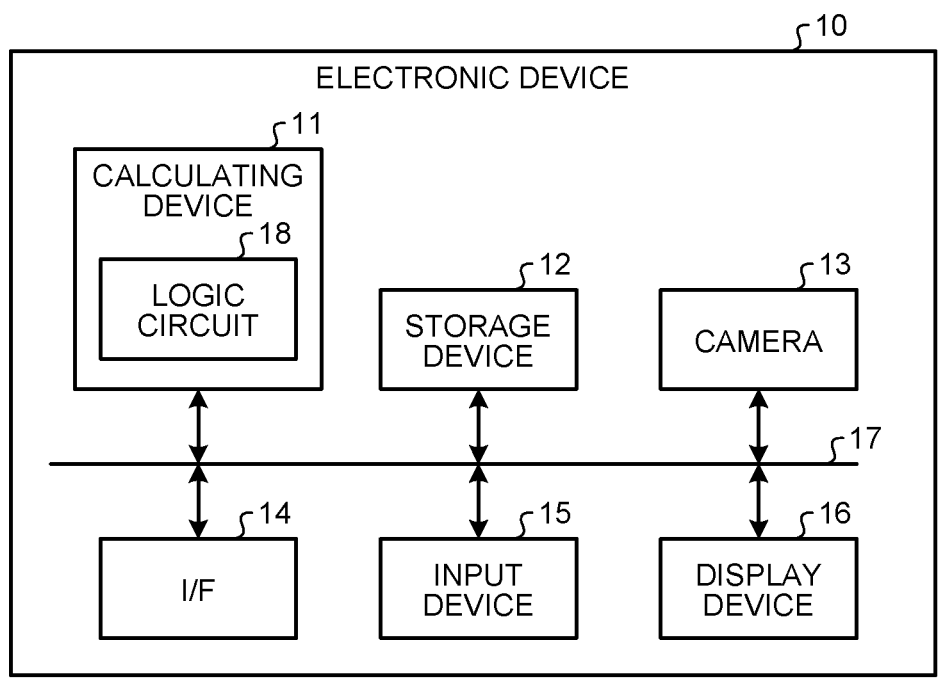
FIG. 9 is a hardware configuration diagram illustrating an example of an electronic device including a marker reading device according to the embodiment.

FIG. 9 is a hardware configuration diagram illustrating an example of an electronic device including the marker reading device according to the present embodiment. For example, an electronic device 10 is a portable terminal. The electronic device 10 includes a calculating device 11, a storage device 12, a camera 13, an interface (I/F) 14 for communication with external devices, an input device 15, a display device 16 such as a liquid crystal display, and a bus 17 for data communication among respective units.

The calculating device 11 is a CPU. The calculating device 11 includes a logic circuit 18 that performs calculation based on a marker decoding program. The calculating device 11 controls the hardware units of the electronic device 10. The storage device 12 is configured by a ROM, a RAM, an external storage device or the like. The calculating device 11 performs various programs based on programs stored in the ROM or the like.

The camera 13 captures an image. The camera 2 of the marker reading device 1 may serve also as the camera 13 of the electronic device 10. The input device 15 is a pointing device that receives an input operation for the electronic device 10. The display device 16 displays a screen indicating the operation contents of the electronic device 10, an operation screen, an image captured by the camera 13, or the like. The output device 5 of the marker reading device 1 may serve also as the display device 16 of the electronic device 10.

The marker reading device 1 can be included in an electronic device other than a portable terminal, or can be an electronic device dedicated for reading markers.

According to the marker decoding method of the present embodiment, the marker decoding device 4 acquires decoded data from the magnitude relation between the shading in partial areas in a marker. The marker decoding device 4 identifies the shadings at different resolutions to acquire decoding patterns having different pattern cycles in a stepwise manner. The marker decoding device 4 can decode data multiplexed in a marker in a stepwise manner depending on the resolutions. The marker reading device 1 decodes data by the marker decoding device 4. The marker reading device 1 can read data from a marker in a stepwise manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A marker generating method comprising:
   replacing a value in a bit string with a signal pattern to generate a first signal pattern arrangement;
   dividing the first signal pattern arrangement into a first partial signal and a second partial signal;
   adding the first partial signal having a pattern cycle extended to a pattern cycle of the second partial signal to the second partial signal to generate a second signal pattern arrangement;
   setting a gradation of shading which indicates a signal of the second signal pattern arrangement.

2. The marker generating method according to claim 1, wherein in the signal pattern, two signals respectively having a mutually different level are arranged.

3. The marker generating method according to claim 1, wherein both number of patterns for the first partial signal and that for the second partial signal are a power of two.

4. The marker generating method according to claim 1, wherein number of patterns for the first partial signal and number of patterns for the second partial signal are different from each other.

5. The marker generating method according to claim 1, wherein the second signal pattern arrangement includes signals of three or more different levels.

6. The marker generating method according to claim 1, wherein the shading is expressed by a single color with varied lightness.

7. The marker generating method according to claim 1, wherein when the second signal pattern arrangement is equally divided into two partial signals, a ratio between a total of levels in one of the partial signals and a total of levels in the other one of the partial signals is 1:2.

8. A marker decoding method comprising:
   acquiring a marker;
   comparing shading in two first partial areas in a unit area included in the marker;
   replacing a magnitude relation between the shading in the two first partial areas with a signal pattern to acquire a first decoding pattern;
   acquiring encoded first data included in the marker based on the first decoding pattern;
   comparing shading in two second partial areas in a first partial area;
   replacing a magnitude relation between the shading in the two second partial areas with a signal pattern to acquire a second decoding pattern; and
   acquiring encoded second data included in the marker based on the second decoding pattern.

9. The marker decoding method according to claim 8, wherein in the signal pattern, two signals respectively having a mutually different level are arranged.

10. The marker decoding method according to claim 8, wherein the signal pattern of the first decoding pattern is replaced with a value in a bit string to acquire the first data.

11. The marker decoding method according to claim 10, wherein the signal pattern is replaced with a value in a bit string after a pattern cycle of the first decoding pattern is shortened.

12. The marker decoding method according to claim 8, wherein the signal pattern of the second decoding pattern is replaced with a value in a bit string to acquire the second data.

13. The marker decoding method according to claim 8, wherein the unit area includes a plurality of cells, a cell being the second partial area having set a gradation of shading.

14. The marker decoding method according to claim 8, wherein both number of patterns for the first decoding pattern and that for the second decoding pattern are a power of two.

15. The marker decoding method according to claim 8, wherein number of patterns for the first decoding pattern and number of patterns for the second decoding pattern are different from each other.

16. The marker decoding method according to claim 8, wherein the second decoding pattern is acquired based on a resolution higher than a resolution used for acquiring the first decoding pattern.

17. A marker reading device comprising:
   a camera configured to capture an image;
   a marker detector configured to detect a marker from the image; and
   a marker decoding device that includes a logic circuit configured to perform calculation for decoding data included in the marker, wherein
   the logic circuit
   compares shading in two first partial areas in a unit area included in the marker,
   replaces a magnitude relation between the shading in the two first partial areas with a signal pattern to acquire a first decoding pattern,
   acquires encoded first data included in the marker based on the first decoding pattern, compares shading in two second partial areas in a first partial area,
replaces a magnitude relation between the shading in the two second partial areas with a signal pattern to acquire a second decoding pattern, and
acquires encoded second data included in the marker based on the second decoding pattern.

18. The marker reading device according to claim 17, further comprising an output device configured to output the first data and the second data.

19. The marker reading device according to claim 17, further comprising a display configured to display the image, wherein
the display displays the first data and the second data by overlapping the first data and the second data on the marker.

* * * * *